W. L. PATTERSON.
MULTIPLE PROJECTION APPARATUS.
APPLICATION FILED SEPT. 12, 1913.

1,111,090.

Patented Sept. 22, 1914.

3 SHEETS—SHEET 3.

Inventor
William L. Patterson

Witnesses
Harriet T. Vay
Nelson H. Coffey

By Church & Rich
His Attorneys

UNITED STATES PATENT OFFICE.

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

MULTIPLE PROJECTION APPARATUS.

1,111,090.

Specification of Letters Patent. Patented Sept. 22, 1914.

Application filed September 12, 1913. Serial No. 789,530.

*To all whom it may concern:*

Be it known that I, WILLIAM L. PATTERSON, of Rochester, in the county of Monroe and State of New York, have invented certain new and useful Improvements in Multiple Projection Apparatus; and I do hereby declare the following to be a full, clear, and exact description of the same, reference being had to the accompanying drawings, forming a part of this specification, and to the reference-numerals marked thereon.

My present invention has for its object to provide an apparatus for projecting images of opaque and transparent objects having provision for the illumination of the transparencies which may be supported either in a horizontal or a vertical position, the apparatus being further adapted for the projection of microscopic objects.

To these and other ends the invention consists in certain improvements and combinations of parts all as will be hereinafter more fully described, the novel features being pointed out in the claims at the end of the specification.

Figure 1:
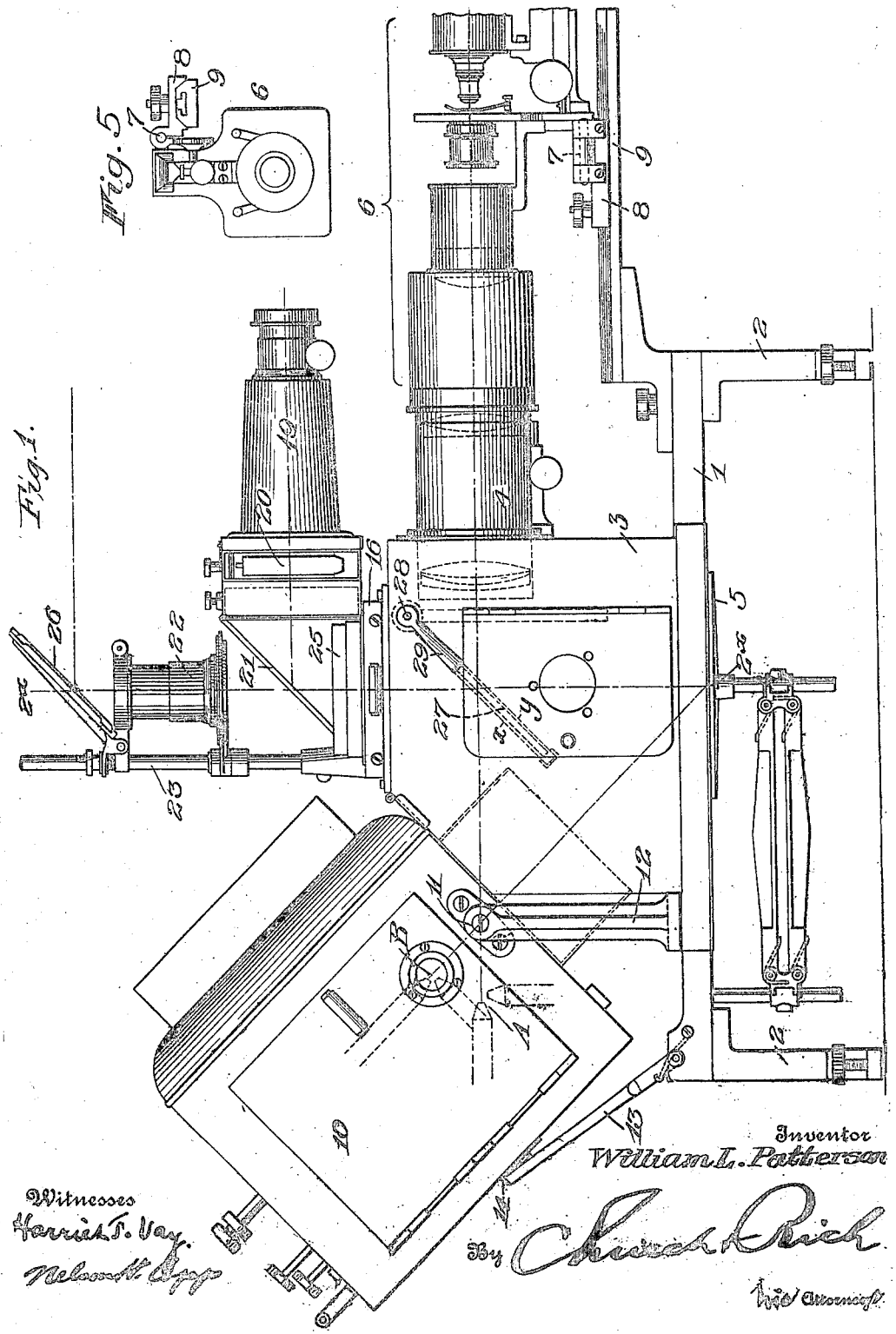
Figure 2:
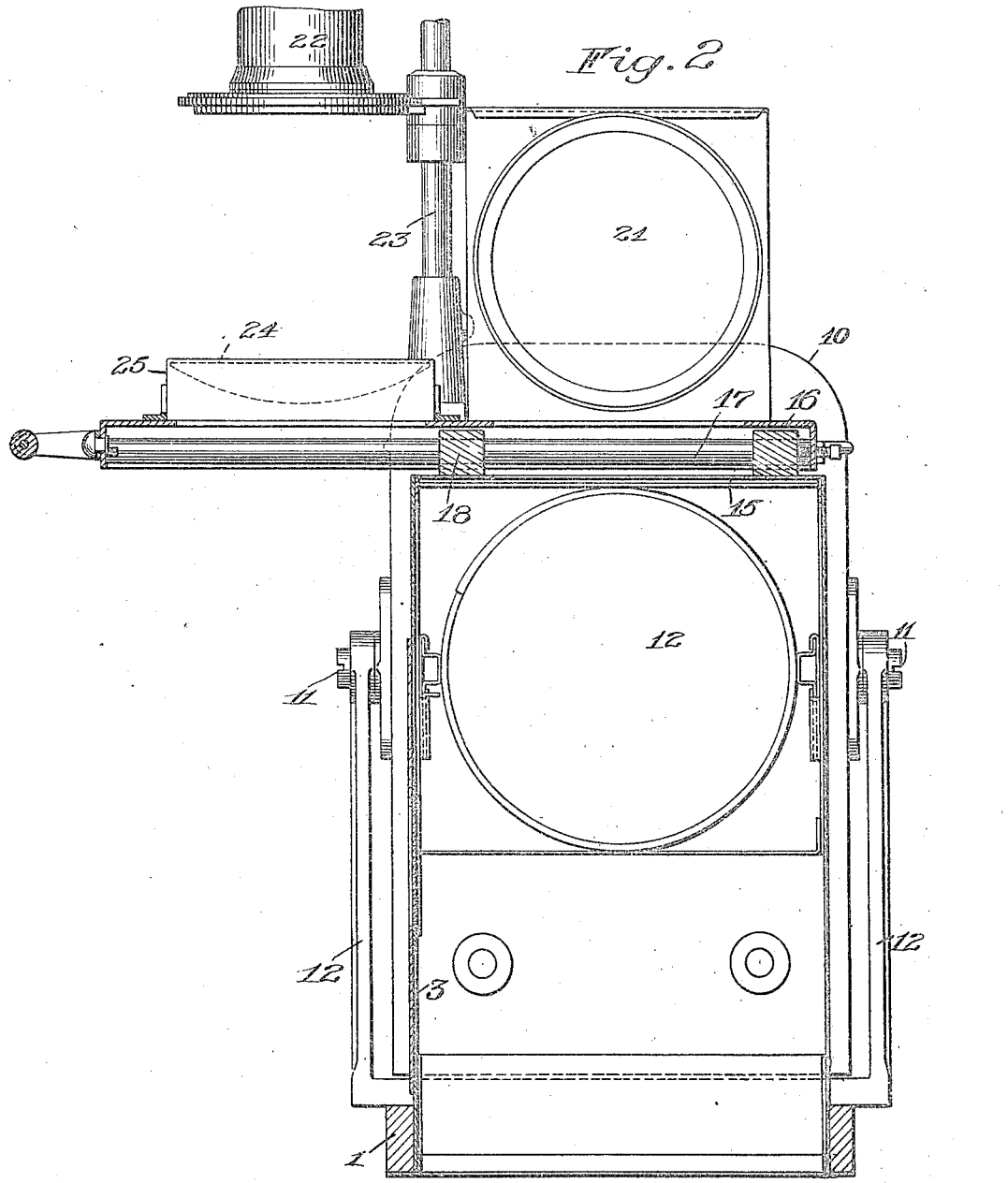
Figure 3:
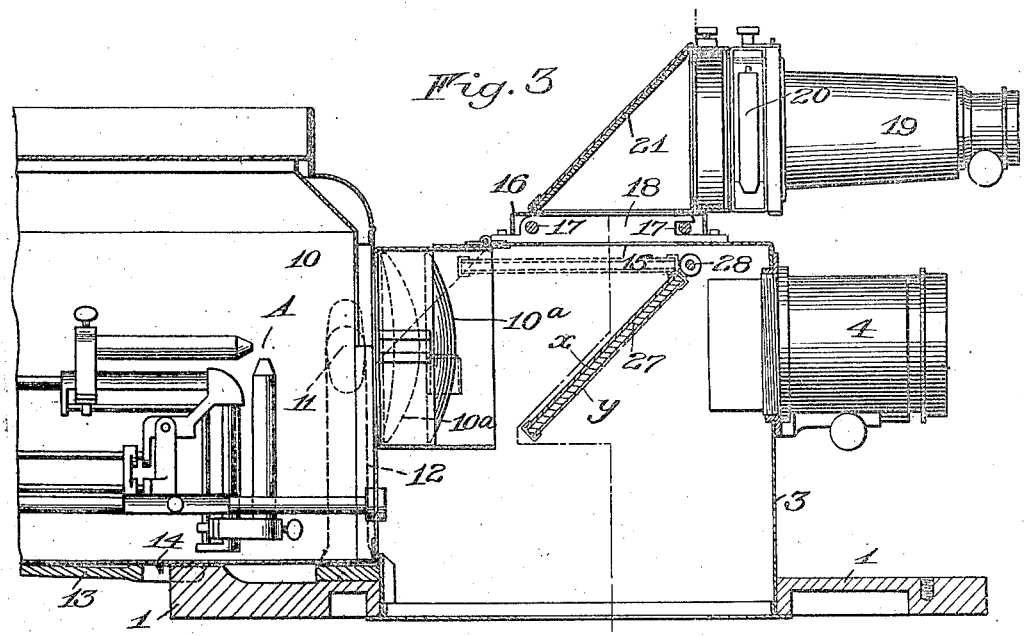
Figure 4:
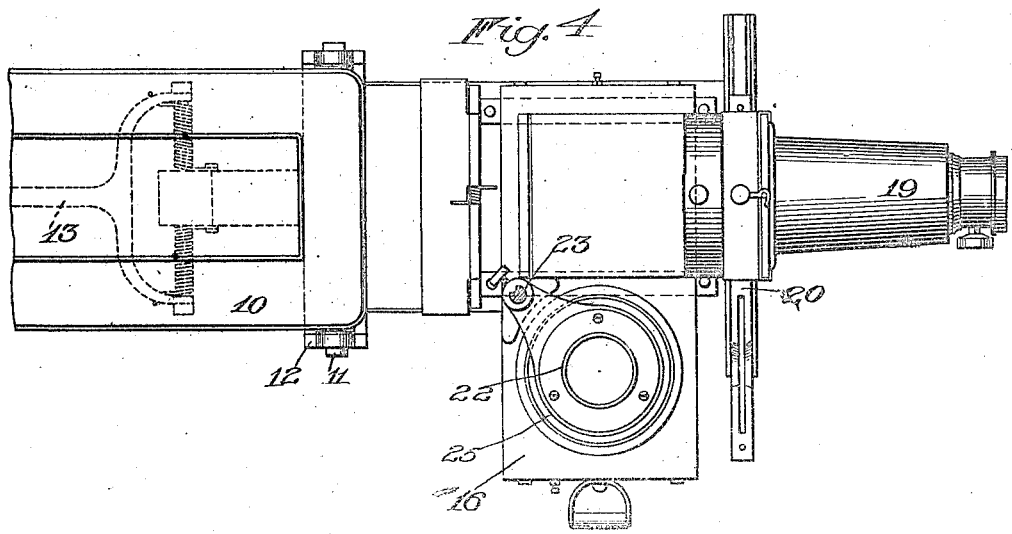

In the drawings: Figure 1 is a side elevation of a projection apparatus constructed in accordance with my present invention; Fig. 2 is a vertical sectional view taken on the line 2ˣ—2ˣ of Fig. 1; Fig. 3 is a vertical longitudinal sectional view; Fig. 4 is a top plan view, and Fig. 5 is a front elevation showing the microscope adjusted into the inoperative position.

Similar reference numerals in the several figures indicate the same parts.

Projection apparatus embodying my invention, comprises generally a lantern or source of illumination, which is movable to change the direction of the beam of light from a horizontal plane into a downwardly inclined plane and in these two positions of adjustment coöperating with different sets of projection lenses, for instance when the lantern is in its normal position, the horizontal beam of light may be permitted to pass unobstructed through powerful condensers to illuminate the system of lenses used for the magnification and projection of microscopic objects, or these horizontal rays of light may be deflected upwardly by a movable reflector, the vertical pencil then serving to illuminate two systems of lenses adapted one for the projection of vertical transparencies, such as lantern slides, the other for the projection of objects which must be maintained in a horizontal position, such as the contents of a liquid solution. The lantern when inclined directs its beam of light in a downward direction for illuminating opaque objects from which the rays of light are received and may be reflected by a mirror into the first mentioned system of lenses and at such times the microscope is moved into the inoperative position. The mirror mentioned coöperates with the lantern in its two positions of adjustment and has two parallel reflecting surfaces, at its opposite sides, and is positioned so that by merely swinging the lantern the apparatus is converted from an opaque projector to a transparent projector, or vice versa.

The apparatus illustrated to show one embodiment of my invention, comprises the base frame 1, supported upon suitable legs 2, carrying the dark chamber or casing 3, from the front wall of which extends the horizontal system of lenses 4 adapted for the projection of images of opaque objects placed upon the holder 5, beneath said chamber. Said system of lenses also coöperates with the projection microscope 6, which latter is mounted on the pivot 7 on a head 8, adjustable longitudinally on the rail 9, at the forward end of the frame 1, and is movable from the position shown in Fig. 1 to that shown in Fig. 6.

At the rear side of the dark chamber 3 is located the lantern 10, preferably containing as a source of illumination, the carbons of an arc lamp, which in their normal position are at the point A in alinement with the axis of the lens system 4. The lantern 10 is pivoted at its forward edge at the point 11 upon uprights or standards 12, so that it may be moved into the inclined position shown in Fig. 1, and the arcing point of the carbons shifted to the point indicated by B, so that the parallel rays of light passing into the chamber 3 through the condensers 10ᵃ impinge upon the opaque object holder 5. The lantern, in its normal position shown in Fig. 3, rests upon the frame 1 in a horizontal position and when elevated, as shown in Fig. 1, is supported by a spring operated brace arm 13, the outer end of which acts as a pawl and engages beneath the projection 14 on the bottom of the lantern.

In the top of the chamber 3 in alinement with the object holder 5, is an aperture 15 and movable into registration therewith are the two systems of lenses provided for the projection of vertical and horizontal transparencies. These lens systems are mounted upon a carriage 16, having the slide rods 17, guided in bearings 18. One system of lenses indicated by 19 is arranged with its axis in a horizontal plane and extends in front of the holder 20, which is adapted to receive lantern slides or similar objects disposed in a vertical plane, and through which the rays of light are reflected by a mirror 21. The other system of lenses 22 is disposed with its axis extending vertically and is mounted for vertical adjustment upon a pillar 23, so that it may be moved relatively toward or from a collective lens 24, carried in a ring or holder 25 on the carriage 16, the circular edge of said ring serving as a support for dishes of various forms containing transparent objects which from their nature, or form, must be supported horizontally. Above the lens system 22 is another reflector 26 for deflecting the vertical rays of this light forwardly onto the same screen as that on which images from the lens systems 4 and 19 are received.

The path of the rays of light entering the dark chamber 3, is controlled by an adjustable mirror 27, pivoted at 28 and movable from the operative position into the inoperative position by means of the handle 29 arranged exteriorly of the chamber 3. The reflector 27 is a double reflector, that is, it is provided with two parallel reflecting surfaces $x$ and $y$. The former receiving the horizontal light rays and directing them upwardly for the illumination of either of the lens systems 19 or 22, while the under surface $y$ receives the rays reflected from the opaque object holder 5 when the lantern is tilted and serves to deflect said rays into the lens system 4. Reflector 27 is held in the inclined position shown in Fig. 3 by a suitable latch and when it is desired to permit the free course of the light rays through the lens system 4, as is desired when the microscopic apparatus is used, said reflector is rotated upwardly into the inoperative position shown in dotted lines in Fig. 3, permitting the full power of the beam of light to pass into the lens system 4. When the reflector is in its normal position, it will be seen that the horizontal light rays are directed upwardly for the projection of transparencies, and in order to convert the apparatus into a projector for opaque objects, it is merely necessary to rotate the lantern 10 upwardly to the limit of its movement. The rays of light then emitted from the lantern fall at an angle upon the opaque object holder 5 and from it, are reflected upwardly against the surface $y$ and by it deflected horizontally into the system of lenses 4.

It will be observed that the opaque object may be utilized as a reflector which will deflect the rays of light upwardly, when the lantern is adjusted into its inclined position, for the purpose of illuminating the two sets of superposed lens systems. In such instances the double reflector is turned downwardly into the dotted line position shown in Fig. 1, and effectively preventing any light rays from entering the system 4 of primary lenses.

I claim as my invention:

1. In a projection apparatus the combination with a primary system of projection lenses, an opaque object holder at one side of the axis of said system and a secondary system of projection lenses at the other side of said axis, of a lantern adjustable to direct its light rays into the primary system of lenses or onto the opaque object holder, and two parallel reflectors adjustable into the path of the light rays, one for deflecting the light rays emitted by the lantern in its first position into the secondary lens system and the other for deflecting the light rays received from the opaque object holder into said primary system of lenses when the lantern is adjusted into its second position.

2. In a projection apparatus, the combination with two systems of projection lenses and a source of illumination adjustably mounted to direct the rays of light emanating therefrom either in the direction of one of said lens systems or in an angular direction to one side of said axis, of an opaque object holder receiving the light rays projected in the last mentioned direction, and an adjustable reflector having two faces, one of which is interposed in the path of the light rays when directed toward the first mentioned lens system to direct them into the second lens system, the other of said faces receiving the reflected light rays from the opaque object holder and deflecting them into the first mentioned lens system.

3. In a multiple projection apparatus, the combination with a primary and secondary system of projection lenses arranged with their axes intersecting and an opaque object holder arranged in the plane of the two lens systems, of a source of illumination adjustable to direct its light rays either into the primary lens system or onto the opaque object holder, and a member adjustable relatively to the point of intersection of the axes of the two lens systems having one reflecting surface for intersecting light rays directed toward the primary lens system and deflecting them into the secondary lens system and another reflecting surface for receiving light rays from the opaque object holder and directing them into the primary lense system.

4. In a multiple projection apparatus, the combination with primary and secondary systems of lenses arranged with their axes intersecting and means for reflecting light rays disposed in the axis of the secondary system of lenses, of a lantern mounted in alinement with the primary system of lenses and adjustable to direct its rays onto said reflecting means, and a member carrying two reflecting surfaces adjustable into positions to alternately close one or the other of said lens systems against the passage of light rays and also adapted to be positioned relatively to their two axes to cause the secondary lens system to be illuminated when the lantern is in its first mentioned position and the primary lens system to receive reflected light rays when the lantern is moved into its second position of adjustment.

5. In a projection apparatus, the combination with two systems of projection lenses, arranged to project, respectively, images of objects disposed vertically and horizontally, of a source of light comprising means for directing the beam of light rays in an upward direction for both lens systems, a mounting carrying said two lens systems and means for effecting a relative movement between said mounting and said light source to illuminate one or the other of said lens systems.

6. In a projection apparatus, the combination with two systems of lenses for projecting respectively images of objects disposed vertically and horizontally, of a source of illumination disposed beneath and in rear of said lens systems, a reflector for directing the light rays upwardly and means adjustably supporting the two lens systems to permit one or the other to be positioned in alinement with said reflector.

7. In a projection apparatus the combination with a dark chamber, having an aperture in its top, a source of illumination directing light rays into the chamber and a reflector deflecting said rays upwardly into the aperture, of two systems of lenses adapted respectively to project images of objects disposed vertically and horizontally and a frame carrying said lenses mounted on the dark chamber and adjustable to position one or the other of them over the aperture in the top of the chamber.

8. In a projection apparatus, the combination with a dark chamber, having an aperture in its top, a source of illumination directing light rays into the chamber and a reflector deflecting said rays upwardly into the aperture, of two systems of lenses adapted respectively to project images of objects disposed vertically and horizontally and a frame slidingly mounted on the top of the dark chamber to position one or the other of said lens systems in alinement with the aperture.

9. In a multiple projection apparatus, the combination with a dark chamber, a primary system of projection lenses extending from its front wall, means at one side of the axis of said lens system for reflecting light rays upwardly and a lantern arranged to direct its light rays into the dark chamber in alinement with the primary lens system and pivotally supported to permit its light rays to be directed onto said reflecting means, of two systems of secondary lenses located above the dark chamber, one for projecting images of objects disposed vertically and the other for projecting images of objects arranged horizontally and a carrier for said two lens systems movably supported on the dark chamber for alternately positioning them axially in alinement with said reflecting means.

10. In a multiple projection apparatus, the combination with a dark chamber, a primary system of projection lenses extending from its front wall, an opaque object holder at the bottom of the chamber and a lantern arranged to direct its light rays into the chamber in alinement with the primary lens system and pivotally supported to permit illumination of the opaque object holder, of a double reflector arranged to intercept direct light rays in the axis of the primary lens system and deflect them upwardly and to receive light rays from the opaque object holder and deflect them into said lens system, said double reflector being bodily adjustable into positions out of either of the two described paths of rays, a system of lenses for projecting images of horizontally disposed objects and another system of lenses for projecting images of vertically arranged objects and a frame movably supporting said two lens systems above the dark chamber in position to be alternately illuminated by the upwardly directed beam of light rays.

11. In a multiple projection apparatus, the combination with a dark chamber, a primary system of projection lenses, and a lantern arranged to direct its light rays into said lens system, of a reflector normally positioned above the path of said light rays and adjustable to intercept said rays and deflect them upwardly, a frame slidable transversely on the top of the dark chamber carrying vertical and horizontal sets of projecting lenses adapted to be alternately illuminated by the upwardly directed rays of light and holders for vertically and horizontally disposed objects arranged relatively to the respective sets of lenses.

WILLIAM L. PATTERSON.

Witnesses:
WILLIAM G. WOODWORTH,
HENRY C. THON.